Figure 1:
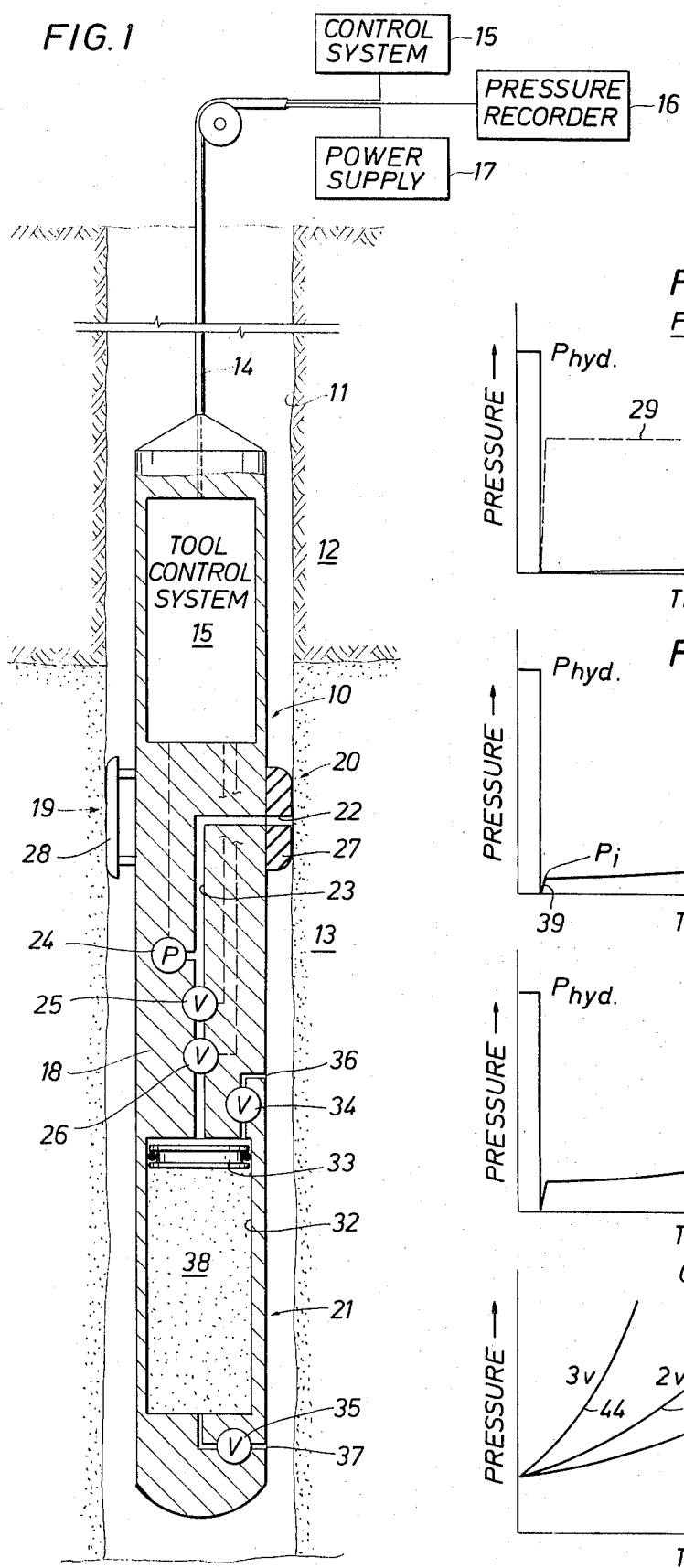

United States Patent [19]

Urbanosky

[11] 3,858,445

[45] Jan. 7, 1975

[54] METHODS AND APPARATUS FOR TESTING EARTH FORMATIONS

[76] Inventor: Harold J. Urbanosky, Pearland, Tex.

[73] Assignee: Schlumberger Technology Corporation, New York, N.Y.

[22] Filed: Mar. 20, 1973

[21] Appl. No.: 343,082

[52] U.S. Cl. .................................................. 73/155
[51] Int. Cl. ............................................ E21b 47/12
[58] Field of Search ............... 73/151, 152, 155, 19; 166/264, 100

[56] References Cited
UNITED STATES PATENTS
2,441,894    5/1948    Mennecier ...................... 73/151 UX
3,452,592    7/1969    Voetter ................................ 73/151

Primary Examiner—Jerry W. Myracle
Attorney, Agent, or Firm—Ernst R. Archambeau, Jr., William R. Sherman, Stewart F. Moore

[57] ABSTRACT

In the representative embodiments of the new and improved methods and apparatus for testing earth formations disclosed herein, fluid-admitting means are placed into sealing engagement with a potentially-producible earth formation. Selectively-operable valve means are opened to place the fluid-admitting means into communication with a vacant accessible portion of a sample chamber that is divided by a piston member movably disposed therein and normally biased toward the inlet to the chamber by a charge of compressed gas confined in the other enclosed portion of the chamber. In this manner, as connate fluids enter the vacant portion of the sample chamber, movement of the piston into the gas-filled chamber portion will further compress the gas charge so as to impose a proportionally-increasing back pressure on the connate fluids that is representative of the rate at which connate fluids, if any, are entering the sample chamber.

13 Claims, 5 Drawing Figures

CONSTANT FLOW RATES

METHODS AND APPARATUS FOR TESTING EARTH FORMATIONS

One of the most successful techniques for determining the production capabilities of earth formations has been to place a wireline formation-testing tool into fluid communication with a selected formation interval and, if possible, obtain a sample of connate fluids. During the sampling operation it is also customary to obtain one or more measurements which are at least indicative of the formation pressures in the interval being sampled.

Those skilled in the art will, of course, appreciate that many different arrangements of formation testers have been employed through the past several years. In general, these tools include a fluid entry port or tubular probe which is cooperatively arranged within a wall-engaging packer for isolating the port or probe from the well bore fluids during the test. To collect fluid samples, these tools further include a sample chamber which is coupled to the fluid entry by a flow line having one or more control valves arranged therein. A suitable pressure transducer is usually arranged in the flow line for transmitting pressure measurements to the surface by way of the cable supporting the tool.

Heretofore, however, no satisfactory arrangement has been provided for reliably determining during the course of a testing operation whether a fluid sample is actually being obtained; or, if a sample is entering the tool, how fast the sample is actually being admitted to the sample chamber. Some indications are, of course, provided by the pressure transducer but these indications can be misleading or false in certain situations. Thus, with the various formation testers of the prior art, it is usually impossible for the operator to know with absolute certainty whether a sample is even being obtained until a considerable time has elapsed. As a result, it is not at all uncommon for the operator to needlessly leave the tool in position over extended periods of hopefully obtain a sample from what is actually a non-producible formation.

Accordingly, it is an object of the present invention to provide new and improved methods and apparatus for reliably and quickly determining when a fluid sample is being obtained during a formation-testing operation and, if a sample is being admitted, obtaining one or more measurements at the surface which are representative of the rate at which connate fluids are entering the tool.

This and other objects of the present invention are attained by pre-filling an enclosed portion of the sample chamber of a formation tester with a gas at an elevated pressure sufficient to impose an initial back pressure of substantial magnitude against one face of a piston cooperatively arranged for movement into the sample chamber as highly-pressured connate fluids enter the other accessible portion of the chamber on the other side of the piston and further compress the pre-filled gas. By observing the pressure variations of the connate fluids during a testing operation one or more determinations can be readily made of the average rate at which the connate fluids are entering the sample chamber.

Figure 2:
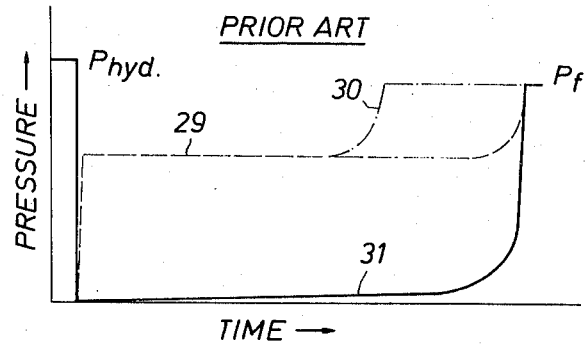
Figure 3:
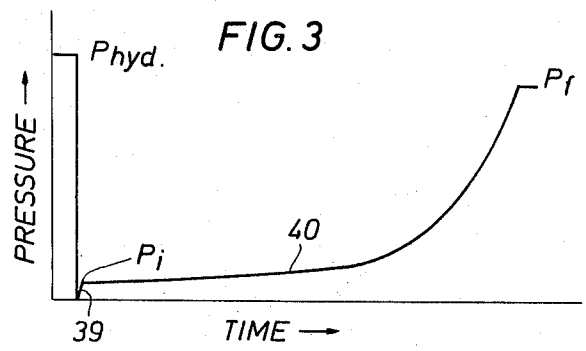
Figure 4:
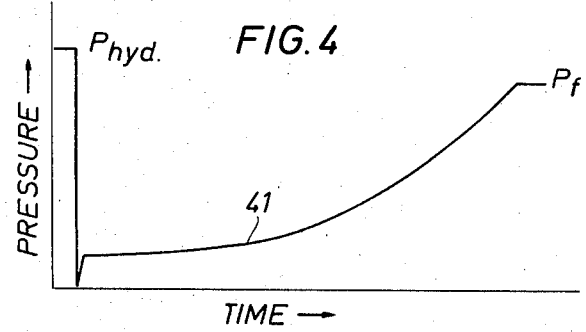
Figure 5:
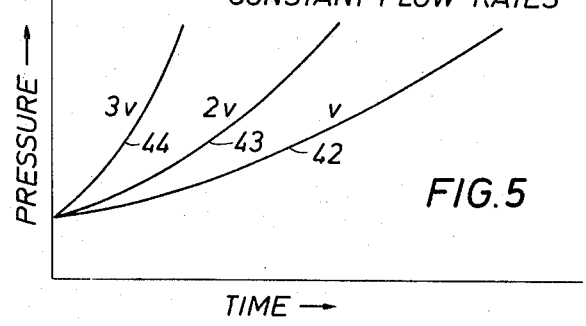

The novel features of the present invention are set forth with particularity in the appended claims. The invention, together with further objects and advantages thereof, may be best understood by way of the following description of exemplary apparatus and methods employing the principles of the invention as illustrated in the accompanying drawings, in which:

FIG. 1 schematically depicts a preferred embodiment of new and improved formation-testing apparatus as it will appear in a well bore as the methods of the present invention are being practiced;

FIG. 2 graphically illustrates representative pressure measurements as might be obtained with typical prior-art formation-testing tools and without the benefit of the new and improved methods and apparatus of the present invention;

FIGS. 3 and 4 are graphical representations of typical pressure measurements which might be obtained while employing the new and improved formation tester of FIG. 1 to practice the methods of the present invention; and FIG. 5 illustrates a representative correlation chart by which the practice of the present invention will enable an operator to approximate the rate at which connate fluids are entering the new and improved formation-testing apparatus of FIG. 1 during a typical sampling operation.

Turning now to FIG. 1, a preferred embodiment of a new and improved sampling and measuring tool 10 incorporating the principles of the present invention is schematically shown as it will appear during the course of a typical measuring and sampling operation in a well bore such as a borehole 11 penetrating one or more earth formations as at 12 and 13. As illustrated, the tool 10 is suspended in the borehole 11 from the lower end of a typical multiconductor cable 14 that is spooled in the usual fashion on a suitable winch (not shown) at the surface and coupled to the surface portion of a tool-control system 15 as well as typical pressure recording-and-indicating apparatus 16 and a power supply 17. In its preferred embodiment, the tool 10 includes an elongated body 18 which encloses the downhole portion of the tool control system 15 and carries selectively-extendible tool-anchoring means 19 and fluid-admitting means 20 arranged on opposite sides of the body as well as new and improved fluid-collecting means 21 arranged in accordance with the principles of the present invention and coupled to the lower end of the tool body.

It should be recognized at the outset that except for the new and improved sample-collecting means 21, the particular design of the other elements of the formation-testing tool 10 is incidental as far as achieving the objects of the present invention are concerned. Thus, except for the unique arrangement of the sample-collecting means 21, the tool-control system 15, the tool-anchoring means 19, and the fluid-admitting means 20 of the tool 10 can be arranged as has been done with any of the formation testers which have been successfully employed heretofore. For example, the tool 10 could incorporate the controls, the tool anchor, or the sample admitter from any of the tools disclosed in U.S. Pat. No. 3,011,554, U.S. Pat. No. 3,104,712, U.S. Pat. No. 3,352,361, U.S. Pat. No. 3,385,364, U.S. Pat. No. 3,653,436 or in patent application Ser. No. 313,235, filed Dec. 8, 1972.

Accordingly, as far as is necessary to understand the principles of the present invention, the formation tester 10 is illustrated schematically in FIG. 1 to show only the essential elements of the tool. As depicted at 22, the fluid-admitting means 20 may alternatively include either a fluid entry port (e.g., as shown generally at "57" in U.S. Pat. No. 3,104,712 or at "106" in U.S. Pat. No. 3,396,796) or a tubular sampling probe (e.g., as shown at "74" in U.S. Pat. No. 3,352,361 or at "45" in U.S. Pat. No. 3,653,436). In either case, the fluid-admitting probe or port, as at 22, is coupled to the sample-collecting means 21 by a sample conduit or flow passage 23 which is communicated with a suitable pressure-measuring device or transducer 24 such as shown in FIG. 9 of U.S. Pat. No. 3,011,554.

In the preferred embodiment of the new and improved tool 10 illustrated in FIG. 1, fluid communication between the fluid-admitting means 20 and the sample-collecting menas 21 is controlled by means such as a normally-closed valve 25 and a normally-open valve 26 which are cooperatively arranged in the flow line 23 and respectively adapted for selective actuation by the tool-control system 15. It will, of course, be appreciated that the control valves 25 and 26 can be arranged as shown in various ones of the aforementioned patents for selective operation from the surface by suitable electrical, explosive, or hydraulic actuating means on the tool body 18.

As is typical, the sample-admitting means 20 further include a packing element, as at 27, which is cooperatively arranged on the tool body 18 around the fluid entry 22 for selective movement outwardly into sealing engagement with the adjacent wall of the well bore or borehole 11 so as to isolate the fluid entry from well bore fluids during a testing operation. Inasmuch as most — if not all — of the aformentioned patents fully disclose various types of suitable packing elements, it is unnecessary to describe the packer 27 further.

Similarly, various types of tool-anchoring means 19 are well described in the aforementioned patents and no useful purpose would be served by redescribing these known arrangements. It should be recognized, of course, that since the tool-anchoring means 19 are provided solely to restrain the tool 10 against longitudinal displacement in the borehole 11 as well as to insure the sealing engagement of the packing element 27 againt the borehole wall during a testing operation, an extendible wall-engaging anchor member, as at 28, is not absolutely essential. For example, where the sample-admitting member alone is extendible over a substantial lateral distance as shown in U.S. Pat. No. 3,385,364, extension of the sample-admitting member will be effective for pressing the rear of the tool against the opposite wall of the well bore with sufficient force to anchor the tool as well as to sealingly engage the sample-admitting member. Conversely, both the sample-admitting member and an anchor member can be arranged to respectively extend in opposite directions as in either U.S. Pat. No. 3,295,615 or in U.S. Pat. No. 3,653,436 where minimum lateral extension of the individual members is preferred. Thus, as far as the objects of the present invention are involved, it is necessary only to provide selectively-operable means of a suitable nature for anchoring the tool 10 and placing the packer 27 into sealing engagement with the wall of the borehole 11 to isolate the fluid entry 22.

To appreciate the significance of the present invention, the prior-art techniques of collecting fluid samples should be first considered. First of all, most, if not all, of the earlier commercially-successful formation testers have employed a so-called "water cushion" arrangement for regulating the rate at which connate fluids are admitted into the sample chamber. As fully explained in U.S. Pat. No. 3,011,554 for example, this arrangement includes a piston member which is movably disposed in an enclosed sample chamber so as to define upper and lower spaces in the chamber. Where the fluid entrance to the sample chamber is above the piston, the empty upper space is initially at atmospheric pressure and the lower space is filled with a suitable incompressible fluid or liquid such as water. A second chamber or liquid reservoir which is also initially empty and having a volume equal to or greater than the lower space is communicated with this lower water-filled space by a suitable flow restriction such as an orifice. Thus, as connate fluids enter the empty upper portion of the sample chamber, the piston will be progressively moved downwardly from its initial elevated position to displace the water from the lower portion of the sample chamber through the orifice and into the initially-empty liquid reservoir. In this manner, as highly-pressured connate fluids are admitted to the sample chamber, the rate at which these fluids can enter the chamber will be held at a substantially-constant value as determined by the sizing of the orifice.

It will, therefore, be appreciated that since the flow rate is constant with this arrangement, the flow line pressure ahead of the sample chamber will also remain substantially constant for almost the entire time required for the sample chamber to be filled. Thus, as seen at 29 in FIG. 2, the pressure measurements from the flow line pressure transducer will provide only an unvarying reading from the time that the sample chamber is first opened to just before the chamber is completely filled. As a result, the operator has no unequivocable indication whether a sample is entering the sample chamber or, if so, how fast the sample is being admitted during a major portion of the testing operation. To further complicate the situation, if the orifice unknowingly becomes wholly plugged during the sampling operation, the pressure will rapidly rise to the formation pressure, $P_f$, (as shown at 30) even though the piston has prematurely halted and connate fluids are no longer entering the sample chamber. In many cases this may give the operator a false indication that a complete sample has been obtained. A partial blockage of the orifice can also give erroneously-high measurements which falsely indicate a high rate of fluid admission.

An analogous situation will occur where no water cushion is employed and flow regulation is instead accomplished by sample-admitting means such as shown generally at "19" in U.S. Pat. No. 3,653,436. As described there, that sample-admitting means reliably regulate the flow rate of connate fluids entering the tool so that only an empty sample chamber which is initially at atmospheric pressure is necessary. With this arrangement, as connate fluids are admitted into the initially-empty sample chamber, the pressure in the flow line will imperceptibly rise at an extremely-slow rate; and, as shown at 31 in FIG. 2, it will not be until the sample chamber is almost filled that any substantial increase in this measured pressure will occur. Thus, hereagain, the operator will have no reliable indication of the rate of fluid entry during the sampling operation.

Accordingly, with either of these prior-art sample chamber arrangements there will be no completely reliable surface indication showing either that a sample is being obtained or — if one is being obtained — how fast the sample is entering the sample chamber throughout the test. As a result, it is often necessary to leave the test tool in position for extended periods to be certain that a complete test is achieved. In addition to needlessly prolonging a sampling operation of a formation which is ultimately determined to be of no commercial interest, there is always an ever-increasing risk that the tool or its supporting cable may become stuck if the test is continued for extended periods.

Thus, the new and improved tool 10 is cooperatively arranged to continuously provide both positive indications that connate fluids are entering the fluid-collecting means 21 as well as measurements representative of the rate of fluid flow into the fluid-collecting means. To achieve this, the new and improved fluid-collecting means 21 are arranged to include an enclosed sample chamber 32 which is coupled to the fluid passage 23 and carries fluid-isolating means such as a piston 33 movably arranged in the chamber for isolating the upper and lower portions of the chamber from one another. In the preferred embodiment of the new and improved tool 10 illustrated in FIG. 1, controlled access to the upper and lower portions of the chamber 32 is provided by normally-closed, manually-actuated valves 34 and 35 which are respectively mounted in conduits 36 and 37 in the tool body 18 for communicating the exterior of the tool with the upper and lower portions of the sample chamber when the tool is at the surface. A compressible gas, as at 38, is introduced into the lower portion of the sample chamber 32 by way of the valve 35 and the conduit 37 and elevated in pressure to a predetermined level, $P_i$. This will, of course, urge the piston 33 to an initial elevated position as illustrated in FIG. 1 where the piston will divide the sample chamber 32 into an initially-empty upper portion of limited volume and a gas-filled lower portion of maximum volume.

Accordingly, in the practice of the methods of the present invention, the new and improved tool 10 is positioned in the borehole 11 and operated as required for engaging the anchor means 19 and the fluid-admitting means 20 against the opposite walls of the borehole. Then, as is typical, the flow line control valve 25 is opened upon command from the surface so as to place the upper portion of the sample chamber 32 into fluid communication with the now-isolated portion of the formation 13. As is typical, since the upper portion of the sample chamber 32 above the piston 33 is at or near atmospheric pressure, if there are producible connate fluids in the formation 13 the formation pressure will be effective for displacing these fluids through the flow line 23 and into the upper portion of the sample chamber. The pressure-responsive transducer 24 will, of course, be effective for providing indications on the surface indicator or recorder 16 which are representative of the pressure of the connate fluids flowing through the passage 23 into the sample chamber 32.

In contrast, however, to the results obtained with prior-art testing tools as graphically depicted in FIG. 2, in the practice of the present invention with the new and improved tool 10, the selectively-pressured gas charge 38 will be effective for restraining the piston 33 against movement until the pressure of the connate fluids in the flow line 23 has at least equalled the initial pressure, $P_i$, of the pressured gas. In other words, disregarding the frictional restraint on the piston 33, the piston cannot be moved downwardly into the sample chamber 32 until the flow line 23 and the upper portion of the sample chamber have been filled with connate fluids and the pressure of these fluids rises to the initial pressure, $P_i$, of the pressured gas charge 38. Thus, as shown at 39 in FIG. 3, the entrance of connate fluids into the sample chamber 32 will be immediately reflected by a rapid and easily-detected increase of the measured flow line pressure to a value equal to the initial pressure of the gas charge 38. Since the void space above the piston 33 is initially very small, only a very small volume of connate fluids is required to achieve a substantial increase in the pressure in the flow line 23 as measured by the transducer 24. Accordingly, as one aspect of the present invention, a rapid rise of the pressure in the flow line 23 reliably signifies that at least some connate fluids have entered the sample chamber 32. On the other hand, the lack of such a sharp pressure rise (as at 39) will, of course, be a clear indication that connate fluids are not entering the sample chamber 32.

Once connate fluids have filled the flow line 23 and the upper portion of the sample chamber 32 to the extent that the pressure of these fluids approaches the initial pressure, $P_i$, of the gas charge 38, the further entrance of connate fluids into the upper end of the sample chamber will, of course, be accompanied by an increase in the pressure of the connate fluids as shown at 40 in FIG. 3. This will, therefore, cause the piston 33 to be displaced further into the sample chamber 32 to accommodate the increase in sample volume. As a further aspect of the present invention, however, displacement of the piston will be accompanied by a proportional increase in the pressure of the gas charge 38. This increase in pressure will, of course, be in keeping with the general gas laws. Thus, as the gas charge 38 is further compressed, a greater restraining force will be imposed on the piston 33 so that the pressure of the connate fluids filling the upper end of the sample chamber 32 and the flow line 23 must also correspondingly increase. As seen at 40, this will, of course, cause corresponding increases in the pressure measurements provided by the transducer 24. As a result, further progressively-rising pressure indications will be successively provided at the surface reliably signifying that connate fluids are still entering the sample chamber 32. This is, of course, a clear distinction from the prior art as shown in FIG. 2 where only a constant or unvarying pressure measurement is obtained over a long period of time.

It should be noted that the pressure measurements provided by practicing the present invention will be related to the initial pressure, $P_i$, of the gas charge 38. Thus, if the gas charge 38 has an initial pressure, $P_i$, of 100-psig, for example, movement of the piston 33 to its mid-point in the sample chamber 32 will compress the gas charge to 200-psig. Similarly, further movement of the piston 33 to the "three-quarters" point in the sample chamber 32 will redouble the pressure of the trapped gas charge 38 to 400-psig.

Although pressure changes of this order of magnitude will be readily detectable with typical pressure-measuring transducers, as at 24, it will be appreciated that more-positive measurements can be obtained by further increasing the initial pressure of the gas charge 38. Thus, as illustrated at 41 in FIG. 4, if the initial pressure of the gas charge 38 is doubled to, for example, 200-psig, movement of the piston 33 to the mid-point of the sample chamber 32 will raise the pressure of the gas charge to 400-psig and movement of the piston to the "three-quarters" point will redouble this pressure to 800-psig. These significant increases in the pressure measurements provided by the transducer 24 will, of course, be readily indicated on the recorder 16.

It should be appreciated, moreover, that since the gas charge 38 will be responding in keeping with the general gas laws, calculations can be readily made to determine the volume of connate fluids in the sample chamber 32 at any given time. For example, as previously described, doubling of the initial pressure, $P_i$, of the gas charge 38 will signify that the sample chamber 32 is half-full and redoubling of this doubled pressure will indicate that the sample chamber is now three-fourths full. Since the volume of the sample chamber 32 is known, it can, therefore, be readily determined that a given quantity of connate fluids has entered the sample chamber when the initial pressure, $P_i$, of the gas charge 38 has increased by a known amount. Thus, by observing how long it has taken for the pressure of the gas charge 38 to increase from one selected value to another, a reasonably-accurate approximation can be made of the average flow rate of connate fluids entering the sample chamber 32.

To facilitate these flow rate determinations, constant flow rate curves such as shown at 42–44 in FIG. 5 can be readily developed for given values of the initial charge pressure, $P_i$. By use of curves such as these, a measured pressure at a given elapsed time can be readily converted to a corresponding average flow rate of connate fluids. A typical curve, as at 42, can be computed for a given pre-charge pressure, $P_i$, by calculating the volume of the upper accessible portion of the sample chamber 32 at each of several incremental positions of the piston 33. Then, by use of the general gas laws, the pressure of the pre-charged gas 38 at each of the incremental positions of the piston 33 can be readily determined. These figures can then be easily employed to determine how long it will take to fill the upper portion of the chamber 32 to each incremental volume at a selected rate of flow, as at $v$, of connate fluids. Plotting these results as function of time versus pressure will, therefore, provide a useful family of constant flow rate curves as at 42–44.

It will be seen, therefore, that by observing the rapid changes in pressure indications provided by the pressure transducer 24, the operator will quickly learn if connate fluids are indeed entering the sample chamber 32. Moreover, as described above, a fairly accurate estimation can be made in short order as to whether the rate of fluid entrance justifies a continuation of the sampling operation.

Once a fluid sample is obtained, the tool control system 15 is operated for closing the control valve 26 so as to trap the collected sample in the chamber 32. Then, the anchor 28 and the packer 27 are retracted and the tool 10 is returned to the surface. To remove the sample from the chamber 32, a suitable collection chamber (not shown) is then coupled to the passage 36 and the valve 34 is opened. It will be appreciated, of course, that once the valve 34 is opened, the gas charge 38 will return the piston 33 to its initial position and displace the collected sample from the chamber 32. Once the sample is removed, the gas charge 38 will be reduced to its initial pressure, $P_i$, and the piston 33 will again be in the position shown in FIG. 1. Thus, there is rarely any reason to disturb the gas charge 38 so long as it remains at its initial pressure, $P_i$.

Accordingly, it will be appreciated that the present invention has provided new and improved methods and apparatus for obtaining samples of connate fluids from earth formations. By biasing a fluid-isolating piston to an initial position in the sample chamber of an otherwise typical formation-testing tool with a charge of compressed gas at an initial elevated pressure, displacement of the piston further into the sample chamber will be accomplished only by further compressing the trapped gas charge. Since the charge of compressed gas will be further compressed in keeping with the general gas laws and the pressure of the gas charge must at all times equal the pressure of connate fluids entering the sample chamber, the resulting changes in the measured sample pressure will be representative of the movement or position of the isolating piston. Then, by using these pressure measurements accurate determinations can be made of the rate at which connate fluids, if any, are entering the sample chamber.

While only a particular embodiment of the present invention and one mode of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for investigating earth formations traversed by a well bore and comprising the steps of:
   isolating a wall surface of said well bore adjacent to an earth formation believed to contain producible connate fluids from well bore fluids;
   communicating an empty sample chamber with said isolated wall surface for inducting a sample of connate fluids from said earth formation into said sample chamber;
   regulating the flow of said connate fluid sample as it is inducted into said sample chamber by imposing a progressively-increasing restraining force on said inducted connate fluid sample for correspondingly increasing the pressure of said connate fluid sample as it continues to enter said sample chamber; and
   monitoring the pressure of said connate fluid sample for obtaining at least a first pressure measurement indicative of the admission of said connate fluid sample into said sample chamber.

2. The method of claim 1 further including the additional step of:
   obtaining at least a second measurement of the pressure of said connate fluid sample at a later time for determining from said first and second pressure measurements a function representative of the average flow rate at which said connate fluid sample is entering said sample chamber.

3. The method of claim 1 wherein said restraining force has a predetermined initial magnitude selected for increasing the pressure of said connate fluid sample to a corresponding predetermined initial magnitude as said connate fluid sample first begins to enter said sample chamber so that when said one pressure measurement attains said predetermined initial magnitude it will indicate the initial entrance of said connate fluid sample into said sample chamber.

4. The method of claim 3 further including the additional step of:

obtaining at least two successive measurements of the pressure of said connate fluid sample at different times for determining a function representative of the average flow rate at which said connate fluid sample is entering said sample chamber.

5. The method of claim 1 wherein said restraining force has a predetermined initial magnitude selected for increasing the pressure of said connate fluid sample to a corresponding predetermined initial magnitude as said connate fluid sample first begins to enter said sample chamber so that subsequent increases in the pressure of said connate fluid sample will be at progressively-greater magnitudes than said corresponding initial magnitude as said connate fluid sample continues to enter said sample chamber and further including the additional step of:

re-monitoring the pressure of said connate fluid sample for subsequently obtaining at least a second pressure measurement greater than said initial magnitude indicative of the continuing entrance of said connate fluid sample into said sample chamber.

6. The method of claim 5 further including the additional step of:

correlating said first and second pressure measurements as a function of time for determining the average flow rate at which said connate fluid sample is entering said sample chamber.

7. A method for investigating earth formations traversed by a well bore and comprising the steps of:

isolating a wall surface of said well bore adjacent to an earth formation believed to contain producible connate fluids from well bore fluids:

communicating said isolated wall surface with an empty expandable sample chamber adapted to be expanded from an initial limited capacity to a selected maximum capacity for inducting a sample of connate fluids from said earth formation into said sample chamber;

imposing an initial restraining back pressure of a selected magnitude within said sample chamber for limiting the expansion of said sample chamber beyond its said initial capacity until said connate fluid sample is at a selected pressure sufficient to overcome said initial restraining back pressure;

monitoring the pressure of said connate fluid sample for determining when said connate fluid sample reaches said selected pressure to provide a first indication at the surface that said connate fluid sample is beginning to enter said sample chamber;

progressively increasing said initial restraining back pressure to increased back pressures as said connate fluid sample continues to enter said sample chamber for correspondingly increasing the pressure of said connate fluid sample as said sample chamber is expanded from its said initial capacity toward its said maximum capacity; and re-monitoring the pressure of said connate fluid sample for determining when said connate fluid sample exceeds said selected pressure to provide a second indication at the surface that said connate fluid sample is continuing to enter said sample chamber.

8. The method of claim 7 wherein said initial capacity of said sample chamber is negligible in relation to its said maximum capacity.

9. The method of claim 7 further including the additional steps of:

after said connate fluid sample reaches said selected pressure, obtaining at least two successive measurements of the pressure of said connate fluid sample at spaced time intervals; and correlating said successive pressure measurements for determining a function representative of the average flow rate at which said connate fluid sample is entering said sample chamber.

10. The method of claim 7 wherein said back pressures are imposed within said sample chamber by disposing a movable piston member in said sample chamber for dividing said sample chamber into a sample-receiving portion adapted to be expanded from said initial capacity to said maximum capacity upon movement of said piston member into said sample chamber as well as an enclosed portion adapted to be contracted upon movement of said piston member into said sample chamber, and filling said enclosed chamber portion with a pressured compressible gas for imposing said back pressures against said piston member in relation to the position of said piston member within said sample chamber.

11. The method of claim 10 wherein said compressible gas has a predetermined initial pressure which will increase in accordance with the general gas laws as said connate fluid sample first begins to enter said sample-receiving chamber portion so that the continued entrance therein of said connate fluid sample will progressively increase the pressure of said connate fluid sample as said compressible gas is further compressed above said restraining back pressure by movement of said piston member into said sample chamber.

12. Formation-testing apparatus adapted for suspension in a well bore traversing earth formations and comprising:

a body having a fluid passage adapted to receive connate fluids;

fluid-admitting means on said body and adapted to be selectively engaged with a well bore wall for isolating a portion thereof from well bore fluids;

means on said body and selectively operable for positioning said fluid-admitting means against a well bore wall to establish communication with connate fluids in earth formations therebeyond;

sample-collecting means on said body and including a sample chamber, and means selectively operable for coupling said fluid passage to said sample chamber to receive connate fluids entering said fluid-admitting means;

pressure-measuring means including a pressure transducer on said body adapted for providing indications at the surface representative of the pressure of connate fluids entering said sample chamber; and flow-regulating means cooperatively associated with said sample chamber and adapted for initially blocking admission of connate fluids into said sample chamber until connate fluids in said fluid passage attain an initial predetermined back pressure and thereafter imposing a progressively-increasing back pressure on such connate fluids which is proportionally related to the volume of such connate fluids contained in said sample chamber.

13. The formation-testing apparatus of claim 12 wherein said flow-regulating means are comprised of:

a piston member movably disposed within said sample chamber for dividing said sample chamber into a first sample-receiving portion adapted to be expanded from an initial minimum capacity to a maximum capacity upon movement of said piston member into said sample chamber as well as a second enclosed portion adapted to be contracted upon movement of said piston chamber; and a pressured compressible gas in said second chamber portion imposing an initial selected restraining pressure against said piston member for restraining movement thereof until connate fluids in said fluid passage attain said initial back pressure and thereafter imposing a progressively-increasing restraining pressure against said piston member in keeping with the general gas laws as connate fluids enter said first chamber portion.

* * * * *